United States Patent [19]

Jones et al.

[11] 3,960,819

[45] June 1, 1976

[54] CATALYTIC PREPARATION OF POLYAMIDES FROM BIS(AMINOPHENYL)SULPHONE

[75] Inventors: Eileen Jones; Arthur Morris; Ieuan Thomas; James Rodney Traynor, all of Runcorn, England

[73] Assignee: Imperial Chemical Industries, Ltd., London, England

[22] Filed: Mar. 4, 1974

[21] Appl. No.: 447,992

Related U.S. Application Data

[63] Continuation of Ser. No. 177,831, Sept. 3, 1971, abandoned.

[30] Foreign Application Priority Data

Sept. 3, 1970 United Kingdom............... 42220/70

[52] U.S. Cl................................ 260/78 R; 252/437

[51] Int. Cl.² ........................................ C08G 69/28
[58] Field of Search .................................. 260/78 R

[56] References Cited
UNITED STATES PATENTS

| | | | |
|---|---|---|---|
| 3,671,498 | 6/1972 | Knight................................ | 260/78 R |
| 3,673,162 | 6/1972 | Buckley et al. ................... | 260/78 R |

*Primary Examiner*—Harold D. Anderson
*Attorney, Agent, or Firm*—Cushman, Darby & Cushman

[57] ABSTRACT

Melt polycondensation of bis(aminophenyl)sulphone with dicarboxylic acid, especially aliphatic dicarboxylic acid, using as catalyst a specified Group VB compound, or metal salt or complex thereof. Typical catalysts are phosphinates or phosphonates in admixtures with metal salts.

4 Claims, No Drawings

CATALYTIC PREPARATION OF POLYAMIDES FROM BIS(AMINOPHENYL)SULPHONE

This is a continuation of application Ser. No. 177,831 filed Sept. 3, 1971 now abandoned.

This invention relates to the production of polyamides from aromatic diamines by a melt process.

The production of commercially useful polyamides from aromatic diamines by high temperature melt procedure has presented special problems because of their much slower reaction with dicarboxylic acids compared with aliphatic diamines and because their polyamides with dicarboxylic acids tend to undergo thermal degradation at the temperatures required for a high temperature melt process. Thus, decomposition competes with polymerisation making it difficult to attain the required molecular weight for moulding applications or film or fibre formation.

Our invention provides a process for making a polyamide suitable for moulding or conversion to film or fibre in which at least one bis(aminophenyl) sulphone (or amide forming derivative thereof) and at least one dicarboxylic acid (or amide forming derivative thereof) in substantially equimolar proportions are heated together at 160°–330°C under an inert atmosphere in the presence of, as catalyst, 1. at least one compound selected from those having the general formulae
    a. $R_3E$
    b. $(R'O)_3E$
    c. $R''_n(OH)_{3-n} E = O$ or
2. a metal salt or metal complex of (a), (b) or (c) or
3. an admixture of a metal salt (including oxide) with a compound (a), (b), or (c) where R is an aryl or substituted aryl group; R' is an alkyl or substituted alkyl group; R'' is a hydrocarbyl or oxyhydrocarbyl group or a substituted derivative thereof; E is an element of Group VB of the periodic table of elements having an atomic number greater than 7; n is 1, 2 or 3, or
4. an alkali metal antimony salt of an organic acid.

Preferred catalysts are selected from the group consisting of at least one compound having the formula $(RO)_2RE=O$ and a product obtained by mixing a compound having the formula $(RO)_2RE=O$ with at least one metal salt, where R is an alkyl or phenyl group and E has the meaning given above.

The process of the invention is especially suitable for preparing polyamides from 4,4'-, 3,3'- or 3,4'-diaminodiphenyl sulphone. Mixtures of two or more bis(aminophenyl)sulphones may be used if desired. It is preferred that the bis(aminophenyl)sulphone forms substantially all of the diamine component, but it is possible to replace part of the said diamine with other diamines, and such a procedure sometimes has the advantage of giving a product which has improved colour, or is easier to process.

Preferably these other diamines, which may replace up to 20 mole % of the bis(aminophenyl)sulphone are aliphatic diamines defined by the general formula

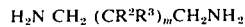

where $R^2$ and $R^3$ are hydrogen atoms or alkyl groups having not more than 4 carbon atoms, and m is an integer from 0 to 10.

The preferred proportion of the aliphatic diamine in the total amount of diamine used in the reaction is 5 to 10%.

The dicarboxylic acid used in the polycondensation is preferably a linear aliphatic acid, especially adipic acid, sebacic acid, azelaic acid, pimelic acid, suberic acid or other $\alpha,\omega$-polymethylene dicarboxylic acid, preferably having from 6 to 16 carbon atoms in all. A mixture of two or more acids may be used if desired and the acid or acids may be replaced by their diphenyl esters, if desired.

However, it is often advantageous to replace up to 36 mole % of the linear aliphatic acid with one or more carbocyclic dicarboxylic acids. The effect of this is usually to increase hydrolytic stability. 10 – 25 mole % of the carbocyclic diacid is about optimum.

Examples of suitable carbocyclic dicarboxylic acids are cyclopentane, cyclohexane, terephthalic, isophthalic and polynuclear aromatic dicarboxylic acids. Isophthalic acid is the most useful of these. Mixtures of acids may be used.

THE CATALYST 1.a. $R_3E$

Triarylphosphine, arsine, stibine and the corresponding bismuth compounds may be used. Triphenyl phosphine, arsine, stibine and bismuth are preferred.

1.b. $(R'O)_3E$

Trihydrocarbyl phosphites and arsenites are also suitable, for example, tributyl phosphite.

1.c. $R''_n(OH)_{3-n}E = O$

This general formula includes phosphine oxides, arsine oxides, phosphinates, arsinates, phosphonates, arsonates, phosphates and arsenates (in each case n = 3). The hydrocarbyl group may be substituted with further groups containing Group VB atoms, as in diphosphine dioxides. Preferably the hydrocarbyl groups attached to the Group VB atoms either directly or via an oxygen atoms are phenyl or substituted phenyl groups, or lower alkyl groups having 1 to 8 carbon atoms, such as methyl, ethyl, n-propyl, iso-propyl, n-butyl, or hexyl. Examples of the process using diethyl ethylphosphonate, methyl phenylmethylphosphinate, triethyl phosphate, tri-n-butylphosphate and triphenylphosphine oxide will be described in detail later.

Acids of Group VB elements are formed when, in the above formula, n = <3.

Dihydrocarbyl phosphinic and hydrocarbyl phosphonic acids are the most useful acids according to this general formula. Catalysis is also achieved using the corresponding arsenic compounds but the products may be dark in colour. Preferred hydrocarbyl groups are phenyl, and alkyl having 1 to 8 carbon atoms, especially methyl and ethyl. The use of dimethyl arsinic acid (cacodylic acid) and phenyl arsonic acid will be described in detail later.

2. Metal salts or complexes of 1a, 1b, 1c.

A number of the compounds described above for use as catalysts on their own, form metal salts or complexes which have catalytic activity in our process.

Phosphine and arsine oxides form complexes with metal salts. These are conveniently prepared by direct reaction of the phosphine oxide with the metal salt in solution. Diphosphine dioxide chelates are described in our British Pat. application No. 1,197,717.

Metal phosphinate, phosphonate, arsinate and arsonate complexes are also catalysts. These complexes are usually prepared by the reaction of a metal salt having a weakly acidic anion (e.g. acetate, acetylacetonate, oxide) with the parent Group VB compound. The complexes may be simple or polymeric, and these polymers may be linear or branched, homopolymeric or copolymeric. A preferred group of polymeric compounds are those having the structure:

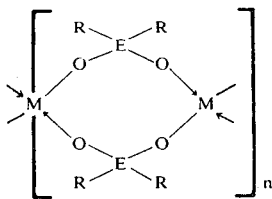

where M is a metal atom, which may have further coordination sites satisfied by other ligands.

E and R have the meanings ascribed above and n is at least 1.

Examples of M include $Ca^{2+}$, $Zn^{2+}$, $Mn^{2+}$, $Co^{2+}$, $Cd^{2+}$, $Cr^{3+}$, $Mn^{3+}$, $Ti^{3+}$, $Ce^{4+}$, $Zr^{4+}$ and $Th^{4+}$.

The use of polymeric calcium ethyl methylphosphonate, polymeric zinc ethyl methylphosphonate, polymeric zinc methylphenylphosphinate, polymeric manganese ethyl ethylphosphonate and monomeric sodium ethyl ethylphosphonate will be described in greater detail later. The preparation of polymeric phosphonates has been described by B. P. Block, (Inorg, Macromol. Rev. 1 (1970) 115–125).

Metal salts of phosphinic, arsinic, phosphonic and arsonic acids are also suitable catalysts. Zinc dimethyl arsinate (zinc cacodylate) is an example.

3. Admixtures of metal salts and compounds (a), (b) and (c).

Mixtures including metal salts, including salts of weak acids such as oxides, acetates (and in fact carboxylic acids in general) and acetyl acetonates are suitable. The use of a mixture may often be more convenient. Metal salts of zinc, manganese, lanthanum, calcium and aluminium and alkali metal halides are preferred. Very suitable Group VB compounds are phosphonates and phosphinates in which the organic group is phenyl or lower alkyl having 1 to 8 carbon atoms. The molar ratio of metal salt to Group VB compound is conveniently from 3:1 to 1:3.

A particularly preferred combination is that of a potassium salt, especially chloride or acetate, in combination with a dialkyl alkylphosphonate in which the alkyl groups contain 1 to 4 carbon atoms, especially diethyl ethylphosphonate.

4. A suitable alkali metal antimony salt of an organic acid is potassium (or sodium) antimony tartrate.

THE PROCESS

The diamine and dicarboxylic acid components of the mixture should be present in equimolar or substantially equimolar proportions where very high molecular weight products are desired. However, a small excess of either, e.g. up to 5 mole %, may be used without the molecular weight falling below the desired level; usually equivalent to a reduced viscosity (measured on a solution of 1 g. of polymer in 100 ml. of a 5 weight-/volume % solution of lithium chloride in dimethyl formamide) of at least 0.5.

The catalyst may be mixed with either of the polyamide forming components of the polymerisation mixture before the two components are mixed together or it may be added to the mixture.

Only very small quantities of catalyst are required to gain benefit therefrom, for example equivalent to from 0.0001 to 1 part by weight of catalyst per 100 parts by weight of the mixture of diamine and diacid. Larger amounts may be used if desired.

A melt polymerisation procedure for polyamides is used. Thus, for example, the diamine component(s), dicarboxylic acid component(s) and catalyst may be charged simultaneously or in any order to a suitable reaction vessel from which the air has already been, or is thereafter, removed, and are then heated at the appropriate reaction temperature, if necessary with the application of vacuum, until the desired molecular weight has been achieved. The reaction is conveniently carried out under nitrogen or other inert gas. Polymer formation will usually be accompanied by an increase in the viscosity of the melt and the degree of polymerisation may be determined by measuring viscosity. As the polymerisation proceeds, it may be found desirable or even necessary to raise the temperature of the mixture in order to maintain it in molten form. The polymerisation temperature required will depend to some extent on the nature of the dicarboxylic acid component of the polymerisable mixture but in general temperatures within the range 160° to 330°C will be found suitable. Preferred temperatures generally lie in the range 220°C to 300°C.

Preferably, at least the latter part of the reaction is effected under vacuum in order to aid the removal of the by-products of the polycondensation. Preferably, also, the reaction is effected in two stages, the first of which is effected at a temperature of 160°C to 240°C, and the second of which is effected at a temperature which is higher than that of the first stage and is generally in the range 220° to 290°C. Preferably, the second stage is effected under a vacuum equivalent to an absolute pressure of 1.0 mm of mercury absolute or less. If desired, the acid content of the product may be reduced by using an excess of the diamine component and/or by including a monofunctional primary or secondary amine or by adding such a compound during the reaction. Preferred amines for this purpose are monoaminodiphenyl sulphones and aliphatic amines. Simple aromatic amines may discolour at high temperatures and should be avoided. The acid residues may be further reduced after processing by the use of a compound which reacts with free carboxyl groups, to give a stable group. Isocyanates and epoxides are suitable.

Free amine end-groups may be neutralised if desired by acylation, e.g. with acetyl chloride. The process may be carried out in the presence of a delustrant such as titanium dioxide.

THE PRODUCTS

Where α,ω-polymethylene dicarboxylic acids having from 6 to 16 carbon atoms in all are polycondensed with the bis(aminophenyl) sulphones, the polyamide products of the invention are generally mouldable amorphous materials which may be injection-, compression-, or transfer-moulded, or extruded into shpaed articles, e.g. fibres, films and thick-walled articles. The products are generally convertible to films, fibres and coatings from solution in suitable solvents.

Before shaping, the polymer may be mixed if desired with any of the usual polymer additives, e.g. heat and light stabilisers, lubricants, fillers, delustrants, mould-realease agents and plasticisers, and may be blended with other polymeric materials, natural or synthetic.

EXAMPLES

The invention is illustrated by the following Examples. Parts are by weight. The di(p-aminophenyl) sulphone used in the Examples is available from I.C.I. Ltd. under the trade name of "Dapsone B.P.". The azelaic acid used was Emery Chemical Company's "Emerox 1144".

EXAMPLE 1

506 parts (102 molar parts) of dry di(p-aminophenyl) sulphone and 380 parts (100 molar parts) of azelaic acid were mixed together in a two liter flange necked flask under an atmosphere of nitrogen. 0.2 parts diethyl ethylphosphonate were then added to the flask and lightly mixed with the other reagents. The flask was then placed in a heater, fitted with a stirrer, nitrogen inlet/outlet and a thermometer then purged with nitrogen for 10 minutes. The reagents were then heated and as soon as it was possible to stir them (around 15 minutes) the stirred was turned on. The heater was then adjusted to keep the melt at about 200°C. After an hour at 200°C the melt was poured into a 3 liter stainless steel stirred polycondensation autoclave which was at about 200°C and had been purged with nitrogen. The autoclave was purged with nitrogen again, the stirrer was then switched on and the melt was stirred at atmospheric pressure while the temperature was raised to 240°C over 30 minutes, then raised to 260°C over the next 30 minutes. The pressure was then slowly reduced to 1.0 mm Hg. The melt was stirred under these conditions for 3.½ hours then the polymer formed was extruded from the autoclave under a nitrogen pressure of 50 lbs. per sq. in. The extruded polymer (Polymer A) was transparent and was found to have a reduced viscosity, measured on a solution of 1 g. of polymer in 100 ml. of a solution of 5 weight/volume % LiCl in dimethyl formamide, of 0.84 dl. $g^{-1}$ at 25°C. The acid content was determined by potentiometric titration of a solution of about 1 g of polymer in 100 ml. of N,N-dimethylacetamide against 0.05N aqueous potassium hydroxide and was found to be 51 $\mu$ equivalents per gram.

A polymer was prepared under essentially the same conditions as above but using 2.5 parts of 50% aqueous hypophosphorous acid (BDH reagent grade). The polymer obtained (Polymer B) was yellow in colour and had a reduced viscosity of 0.89 dl $g^{-1}$ and an acid content of 177$\mu$ equivalent per gram, measured as above.

The melt and hydrolytic stabilities of Polymer A were significantly better than those of Polymer B as shown below.

Samples of A and B were dried at 180°C/1 mm Hg for 2 days. Portions of the dried samples were then compression moulded at 270°C into films 0.01 in. thick which were cut into strips and immersed in boiling water. Strips were removed at various times and the reduced viscosities measured (Table 1).

Table 1

| Time in boiling water (hours) | Reduced Viscosity of film (dl $g^{-1}$) | |
|---|---|---|
| | Polymer A | Polymer B |
| 0 | 0.78 | 0.81 |
| 20 | 0.68 | 0.56 |
| 58 | 0.59 | — |
| 110 | 0.57 | — |
| 170 | — | 0.29 |

Table 1-continued

| Time in boiling water (hours) | Reduced Viscosity of film (dl $g^{-1}$) | |
|---|---|---|
| | Polymer A | Polymer B |
| 280 | 0.38 | — |

Portions of the dried samples were placed in a capillary melt viscometer and their melt stabilities determined (Table 2) at 270°C and at a shear rate of 264 $sec^{-1}$.

TABLE 2

| Time (mins) | Melt Viscosity (Poise) at 270°C | | Reduced Viscosity of Extrudate (dl $g^{-1}$) | |
|---|---|---|---|---|
| | Polymer A | Polymer B | Polymer A | Polymer B |
| 6 | 9680 | 5950 | 0.76 | 0.73 |
| 12 | 9550 | 4730 | | |
| 17 | 9250 | 4660 | | |
| 22 | 9080 | 4130 | | 0.33 |
| 28 | 8780 | 3630 | 0.71 | |

EXAMPLE 2

506 Parts (102 molar parts) of dry di(p-aminophenyl) sulphone, 380 parts (100 molar parts) of azelaic acid and 2 parts of poly-(calcium ethyl methylphosphonate) were reacted as in Example 1 to give a very pale yellow polymer, (Polymer C) slightly opaque, of reduced viscosity 0.77 dl, $g^{-1}$ measured as in Example 1. The colour of polymer C was better than that of polymer B.

The melt and hydrolytic stabilities of polymer C were determined as in Example 1 and were found to be superior to those of polymer B, see Tables 3 and 4.

TABLE 3

| Time in boiling water (hours) | Reduced viscosity of film (dl $g^{-1}$) | |
|---|---|---|
| | Polymer C | Polymer B |
| 0 | 0.77 | 0.81 |
| 20 | — | 0.56 |
| 23 | 0.67 | — |
| 63 | 0.59 | — |
| 150 | 0.52 | — |
| 170 | — | 0.29 |
| 450 | 0.30 | — |

TABLE 4

| Time (mins) | Melt Viscosity (Poise) at 270°C | | Reduced Viscosity of Extrudate (dl $g^{-1}$) | |
|---|---|---|---|---|
| | Polymer C | Polymer B | Polymer C | Polymer B |
| 6 | — | 5950 | 0.73 | 0.73 |
| 8 | 10600 | — | — | — |
| 12 | 10300 | 4730 | — | — |
| 17 | 10000 | 4660 | — | — |
| 22 | — | 4130 | — | 0.33 |
| 23 | 9980 | — | 0.79 | — |

EXAMPLE 3

506 Parts (102 molar parts) of dry 4,4'-diaminodiphenyl sulphone, 380 parts azelaic acid and 2 parts poly(zinc ethyl methylphosphonate) were reacted as in Example 1 to give a pale yellow opaque polymer (Polymer D) of reduced viscosity 0.82 measured also in Example 1. The colour of Polymer D is better than that of Polymer B.

The melt and hydrolytic stabilities of Polymer D were determined as in Example 1 and were found to be superior to those of Polymer B (see Tables 5 and 6).

TABLE 5

| Time in boiling water (hours) | Reduced Viscosity of film (dl g$^{-1}$) | |
|---|---|---|
| | Polymer D | Polymer B |
| 0 | 0.79 | 0.81 |
| 20 | 0.68 | 0.56 |
| 50 | 0.62 | — |
| 134 | 0.48 | — |
| 170 | — | 0.29 |
| 360 | 0.36 | — |

TABLE 6

| Time (mins) | Melt Viscosity (Poise) at 270°C | | Reduced Viscosity of Extrudate (dl g$^{-1}$) | |
|---|---|---|---|---|
| | Polymer D | Polymer B | Polymer D | Polymer B |
| 6 | — | — | — | — |
| 7 | 10700 | 5950 | 0.79 | 0.73 |
| 11 | 10800 | — | — | — |
| 12 | — | 4730 | — | — |
| 17 | — | 4660 | — | — |
| 18 | 10400 | — | — | — |
| 22 | — | 4130 | — | 0.33 |
| 24 | 10150 | — | 0.76 | — |

EXAMPLE 4

The polymerisation process of Example 1 was repeated but using 502 parts (100 molar parts) of undried Dapsone (water content 1.3%), 380 parts 9100 molar parts) of azelaic acid, 0.4 parts of diethyl ethyl phosphonate and 0.4 parts of potassium chloride in 5 parts of water. The temperature of the melt was raised to 290°C after the pressure had been reduced to 1.0 mm of Hg. The extrudate (Polymer E) was pale yellow in colour, paler than Polymer B, and was found to have a reduced viscosity of 0.77 dl g$^{-1}$ and an acid content of 20μ equivalent per gram. The hydrolytic stability of Polymer E, determined as in Example 1 was superior to that of Polymer B.

TABLE 7

| Time in boiling water (hours) | Reduced Viscosity of film (dl g$^{-1}$) | |
|---|---|---|
| | Polymer E | Polymer B |
| 0 | 0.68 | 0.81 |
| 20 | — | 0.56 |
| 24 | 0.60 | — |
| 170 | 0.40 | 0.29 |

EXAMPLE 5

The Polymerisation process of Example 4 was repeated but using 0.8 parts of diethyl ethylphosphonate. 27 Parts of a 15 weight % aqueous suspension of titanium dioxide (Kronos AD) were added approximately 3/4 hour after the reaction was started. The polymer obtained (Polymer F) had a cream colour and was found to have a reduced viscosity of 0.85 dl g$^{-1}$ and an acid content of 20μ equivalents per gram.

The hydrolytic stability of Polymer F, determined as in Example 1, was better than that of Polymer B, see Table 8.

TABLE 8

| Time in boiling water (hours) | Reduced viscosity of film (dl g$^{-1}$) | |
|---|---|---|
| | Polymer F | Polymer B |
| 0 | 0.76 | 0.81 |
| 20 | — | 0.56 |
| 26 | 0.70 | — |
| 170 | 0.55 | 0.29 |

EXAMPLE 6

471 Parts (95 molar parts) of dry di(p-aminophenyl) sulphone, 11.6 parts (5 molar parts) of hexamethylene diamine, 380 parts (100 molar parts) of azelaic acid and 0.4 parts of diethyl ethylphosphonate were mixed in a 2 liter flange-neck flask under nitrogen and then heated for 1 hour at approximately 180°C. The resulting very pale melt was charged into an autoclave heated to 200°C and purged with nitrogen. 11.6 Parts of a 33 weight % aqueous suspension of titanium dioxide (Kronos AD) were then added. Polymerisation was then effected as in Example 1. The reduced viscosity of the resulting cream coloured polymer was found to be 0.66 dl. g$^{-1}$ determined as in Example 1.

EXAMPLE 7

The polymerisation process of Example 1 was repeated but using 496 parts (100 molar parts) of di(p-aminophenyl) sulphone, 346 parts (90 molar parts) of azelaic acid, 33.6 parts (10 molar parts) of isophthalic acid and 0.43 parts of diethyl ethylphosphonate. 10.2 Parts of titanium dioxide (Kronos AD, ex Titangesellschaft MBH, Leverkusen, as a 33 weight % aqueous suspension was charged into the autoclave with the prepolymer melt. The polymer was obtained as a yellow extrudate, its reduced viscosity, determined as in Example 1, was found to be 0.86 dl g$^{-1}$.

EXAMPLE 8

24.8 Parts (100 molar parts) of dry di(p-aminophenyl) sulphone, 19.0 parts (100 molar parts) of azelaic acid, 0.05 parts diethyl ethylphosphonate and 0.02 parts of potassium acetate in 1.0 part of water were mixed in a polymerisation tube and heated under nitrogen in a sand-bath for 15 minutes at 200°C to afford a pale yellow melt. The melt was agitated by the passage of a slow stream of nitrogen. The reaction temperature was raised to 260°C and maintained for 3 hours. The pressure was slowly reduced to give a final vacuum of 0.1 mm Hg and the temperature was then raised to 290°. After 4 hours under these conditions a pale yellow polymer was obtained and its reduced viscosity was found to be 0.77 dl g$^{-1}$, determined as in Example 1.

EXAMPLE 9

24.8 Parts (100 molar parts) of dry di(p-aminophenyl) sulphone, 19.0 parts (100 molar parts) of azelaic acid, 0.05 parts of diethyl ethylphosphonate and 0.02 parts of calcium chloride in 1.0 part of water were reacted as in Example 8. The brown coloured product was found to have a reduced viscosity of 1.33 dl g$^{-1}$, determined as in Example 1.

EXAMPLE 10

24.8 Parts (100 molar parts) of dry di(p-aminophenyl) sulphone, 19.0 parts (100 molar parts) of azelaic acid, 0.05 parts of diethyl ethylphosphonate and 0.008 parts of potassium hydroxide in 1.0 part of water were reacted as in Example 8. The product was pale yellow in colour and had a reduced viscosity of 0.65 dl g$^{-1}$, determined as in Example 1.

EXAMPLE 11

24.8 Parts 9100 molar parts) of dry 4,4'-diaminodiphenyl sulphone and 19.0 parts (100 molar parts) of azelaic acid were mixed together in a polymerisation tube under an atmosphere of nitrogen. 0.1 part of methyl phenyl methylphosphinate was added and the mixture heated in a fluidised sand bath at 200°C. After melting the reactants were agitated by passing a current of nitrogen through the mixture.

Heating was continued at this temperature for 30 minutes during which time some water and a little azelaic acid distilled off and the viscosity of the mixture increased. The temperature was then progressively raised to 260°C over 30 minutes and after a further 30 minutes heating at 260°C the pressure was gradually reduced to 0.5 mm Hg. absolute pressure. Heating was then continued for a further 4 hours.

The final product was a brittle brown foam.

EXAMPLE 12

24.8 Parts (100 molar parts) of dry 4,4'-diaminodiphenyl sulphone 19.0 parts (100 molar parts) of azelaic acid and 0.2 part of cacodylic acid (dimethyl arsinic acid $(CH_3)_2As OOH$) were reacted as in Example 11 and gave a dark brown polymer.

EXAMPLE 13

24.8 Parts (100 molar parts) of dry 4,4'-diaminodiphenyl sulphone, 19.0 parts (100 molar parts) of azelaic acid and 0.2 part of zinc cacodylate ($[(CH_3)_2AsOO]_2Zn$) were reacted as in Example 11 and gave a dark brown polymer which was slightly better in colour then the pure acid, the catalyst residues appeared to be soluble.

EXAMPLE 14

24.8 Parts (100 molar parts) of dry 4,4'-diaminodiphenyl sulphone, 19.0 parts (100 molar parts) of azelaic acid and 0.2 parts phenylarsonic acid ($PhH_2AsO_3$) were reacted as in Example 11, and gave a dark brown polymer.

EXAMPLE 15

24.8 Parts (100 molar parts) of dry 4,4'-diaminodiphenyl sulphone, 19.0 parts (100 molar parts) of azelaic acid and 0.1 parts triphenyl arsine ($AsPh_3$) were reacted as in Example 11, and gave a golden yellow colour. The reduced viscosity measured as in Example 1 was 0.51.

EXAMPLE 16

24.8 Parts (100 molar parts) of dry 4,4'-diaminodiphenyl sulphone, 19.0 parts (100 molar parts) of azelaic acid and 0.1 parts triphenyl stibene ($SbPh_3$) were reacted as in Example 11, and gave an orange coloured polymer with a reduced viscosity of 1.18 measured as in Example 1.

EXAMPLE 17

24.8 Parts (100 molar parts) of dry 4,4'-diaminodiphenyl sulphone, 19.0 parts (100 molar parts) of azelaic acid and 0.1 parts triphenyl bismuth ($BiPh_3$) were reacted as in Example 4, and gave a dark brown polymer, possibly due to reduced bismuth. The reduced viscosity measured as in Example 1 was 0.74.

EXAMPLE 18

24.8 Parts (100 molar parts) of dry 4,4'-diaminodiphenyl sulphone, 19.0 parts (100 molar parts) of azelaic acid and 0.1 part sodium antimony tartrate ($NaSbO.C_4H_4O_6$) were reacted as in Example 11 and gave a pale yellow polymer of reduced viscosity 0.54 measured as in Example 1.

EXAMPLE 19

24.8 Parts (100 molar parts) of dry 4,4'-diaminodiphenyl sulphone, 19.0 part (100 molar parts) of azelaic acid and 0.1 part of polyzinc methylphenylphosphinate were reacted as in Example 11, and gave a clear golden yellow colour of reduced viscosity 0.58 measured as in Example 1.

EXAMPLE 20

24.8 Parts (100 molar parts) of dry 4,4'-diaminodiphenyl sulphone, 19.0 parts (100 molar parts) of azelaic acid and 0.1 part of sodium ethyl ethylphosphonate, were reacted as in Example 11, and gave an opaque pale yellow polymer with a reduced viscosity of 0.53 measured as in Example 1.

EXAMPLE 21

24.8 Parts (100 molar parts) of dry 4,4'-diaminodiphenyl sulphone, 19.0 parts (100 molar parts) of azelaic acid and 0.1 parts of poly magnesium ethyl ethylphosphonate were reacted as in Example 11 and gave an opaque yellow coloured polymer. The reduced viscosity was 0.65.

EXAMPLE 22

24.8 Parts (100 molar parts) of dry 4,4'-diaminodiphenyl sulphone, 19.0 parts (100 molar parts) of azelaic acid and 0.1 part of triethyl phosphate ($Et_3PO_4$) were reacted as in Example 11 and gave a brown/yellow polymer with a reduced viscosity of 0.62 measured as in Example 1.

EXAMPLE 23

24.8 Parts (100 molar parts) of dry 4,4'-diaminodiphenyl sulphone, 19.0 parts (100 molar parts) of azelaic acid and 0.1 parts of tributyl phosphite ($Butyl_3PO_3$) were reacted as in Example 11 and gave a bright yellow polymer with a reduced viscosity of 0.53 measured as in Example 1.

EXAMPLE 24

24.8 Parts (100 molar parts) of dry 4,4'-diaminodiphenyl sulphone, 19.0 parts (100 molar parts) of azelaic acid and 0.1 parts of triphenyl phosphine ($Ph_3P$) were reacted as in Example 11 and gave an orange coloured polymer with a reduced viscosity of 0.45 measured as in Example 1.

EXAMPLE 25

24.8 Parts (100 molar parts) of dry 4,4'-diaminodiphenyl sulphone, 19.0 parts (100 molar parts) of azelaic acid and 0.1 part of triphenylphosphine oxide ($Ph_3PO$) were reacted as in Example 11 and gave a golden yellow polymer. The reduced viscosity was 1.79.

EXAMPLE 26

The polymerisation procedure of Example 11 was repeated but using 0.1 parts of poly(zinc distyryl phosphinate) as catalyst. The orange coloured polymer obtained was found to have a reduced viscosity of 0.79 dl. g$^{-1}$, determined as in Example 1.

EXAMPLE 27

24.8 Parts (100 molar parts) of dry 4,4'-diaminodiphenyl sulphone, 19.0 parts (100 molar parts) of azelaic acid and 0.1 part poly(cobalt ethyl methylphosphonate) were reacted as in Example 11 and gave an opaque orange-yellow polymer with a reduced viscosity of 0.68 as measured in Example 1.

EXAMPLE 28

24.8 Parts (100 molar parts) of dry 4,4'-diaminodiphenyl sulphone, 19.0 parts (100 molar parts) of azelaic acid and 0.1 part poly(manganese ethyl methylphosphonate) were reacted as in Example 11 and gave an orange polymer with a reduced viscosity of 0.76 as measured in Example 1.

EXAMPLE 29

24.8 Parts (100 molar parts) of dry 4,4'-diaminodiphenyl sulphone, 19.0 parts (100 molar parts) of azelaic acid and 0.1 part poly(lanthanum ethyl ethylphosphonate) were reacted as in Example 11 and gave a pale yellow translucent polymer, with a reduced viscosity of 0.64 as measured in Example 1.

EXAMPLE 30

24.8 Parts (100 molar parts) of dry 4,4'-diaminodiphenyl sulphone, 19.0 parts (100 molar parts) of azelaic acid and 0.1 part poly(aluminium phenyl methylphosphinate) were reacted as in Example 11 and gave a pale yellow translucent polymer, with a reduced viscosity of 0.53 as measured in Example 1.

EXAMPLE 31

24.8 Parts (100 molar parts) of dry 4,4'-diaminodiphenyl sulphone, 19.0 parts (100 molar parts) of azelaic acid and 0.2 part poly(cadmium phenyl methylphosphinate) were reacted as in Example 11 and gave a pale yellow polymer, with a reduced viscosity of 0.63 as measured in Example 1.

EXAMPLE 32

24.8 Parts (100 molar parts) of dry 4,4'-diaminodiphenyl sulphone, 19.0 parts (100 molar parts) of azelaic acid and 0.1 part triphenylphosphinic acid were reacted as in Example 11 and gave a golden yellow polymer with a reduced viscosity of 0.54 as measured in Example 1.

EXAMPLE 33

24.8 Parts (100 molar parts) of dry 4,4'-diaminodiphenyl sulphone, 19.0 parts (100 molar parts) of azelaic acid and 0.1 part phenyl methyl phosphinic acid were reacted as in Example 11 and gave an orange yellow polymer with a reduced viscosity of 0.86 as measured in Example 1.

EXAMPLE 34

24.8 Parts (100 molar parts) of dry 4,4'-diaminodiphenyl sulphone, 19.0 parts (100 molar parts) of azelaic acid and 0.1 part manganese bis di-methyl arsine were reacted as in Example 11 and gave a brown polymer with a reduced viscosity of 0.50 as measured in Example 1.

EXAMPLE 35

24.8 Parts (100 molar parts) of dry 4,4'-diaminodiphenyl sulphone, 19.0 parts (100 molar parts) of azelaic acid and 0.1 parts bis triphenyl phosphine cobalt chloride were reacted as in Example 11 and gave a red brown polymer with a reduced viscosity of 0.72 as measured in Example 1.

EXAMPLE 36

24.8 Parts (100 molar parts) of dry 4,4'-diaminodiphenyl sulphone, 19.0 parts (100 molar parts) of azelaic acid and 0.1 part bis triphenyl phosphine nickel chloride were reacted as in Example 11 and gave a brown polymer with a reduced viscosity of 0.54 as measured in Example 1.

EXAMPLE 37

24.8 Parts (100 molar parts) of dry 4,4'-diaminodiphenyl sulphone, 19.0 parts (100 molar parts) azelaic acid and 0.1 part poly(diethoxy phosphine styryl) were reacted as in Example 11 and gave a black polymer with a reduced viscosity of 0.52 as measured in Example 1.

EXAMPLE 38

24.8 Parts (100 molar parts) of dry 4,4'-diaminodiphenyl sulphone, 19.0 parts (100 molar parts) azelaic acid and 0.1 part poly zinc methylphenyl phosphinate were reacted as in Example 11 and gave a clear golden yellow polymer with a reduced viscosity of 0.58 as measured in Example 1.

EXAMPLE 39

25.3 parts (100 molar parts, 1.8% $H_2O$) of 4,4'-diaminodiphenyl sulphone, 15.2 parts (80 molar parts) of azelaic acid, 6.5 parts (20 molar parts) 1,1,3-trimethyl-5-carboxy-3-(p-carboxyphenyl)indane ex Amoco Chemicals, 0.05 part diethyl ethyl phosphonate and 0.16 ml (6g./50 ml $H_2O$) potassium chloride, were reacted as in Example 11 except that the last hour of the experiment was conducted at 290°C. This gave a yellow coloured polymer with a reduced viscosity of 0.53.

EXAMPLE 40

24.8 Parts (100 molar parts) of 4,4'-diaminodiphenyl sulphone 23.0 parts (100 molar parts) decamethylene dicarboxylic acid, 0.1 part diethyl ethyl phosphonate and 1.0 ml (0.1 g./1 ml $H_2O$) potassium chloride, were reacted as in Example 11 but the last hour of the experiment was conducted at 290°C. This gave a yellow/brown polymer with a reduced viscosity of 0.42 as measured in Example 1.

EXAMPLE 41

757.5 Parts (100 molar parts) of undried di(p-aminophenyl) sulphone (1.8% water content) 484.5 parts (85 molar parts) of azelaic acid and 74.7 parts (15 molar parts) of isophthalic acid were mixed together in a closed vessel. 1.2 Parts diethyl ethylphosphonate and 5 parts of an aqueous solution of potassium chloride (6.0 g in 50 ml water) were then added to the closed vessel and mixed. This mixture was then transferred to a 3 liter stainless steel stirred polycondensation autoclave which was at 210°C and had been purged with nitrogen.

The reagents were stirred for 60 minutes at 210°C then the temperature was set at 260°C. After 1 hour the pressure was slowly reduced to 1.0 mm Hg. The temperature of the melt was then raised to 290°C and stirred under these conditions for another 3 hours, then the polymer formed was extruded from the autoclave under a nitrogen pressure of 50 p.s.i. The extruded polymer was transparent and was found to have a reduced viscosity of 0.83 as measured in Example 1.

EXAMPLE 42

504.5 Parts (100 molar parts) of undried di(p-aminophenyl) sulphone (1.7% water content) 304 parts (80 molar parts) of azelaic acid and 66.4 parts (20 molar parts) of isophthalic acid were mixed together in a closed vessel. 1.5 Parts diethyl ethylphosphonate and 10 parts of an aqueous solution of potassium acetate (4 g./50 ml.) were then added to the closed vessel and lightly mixed.

The process was then continued as in Example 40. The extruded polymer was transparent and pale yellow with a reduced viscosity of 0.73 as measured in Example 1.

EXAMPLE 43

757.5 Parts (100 molar parts) of undried di(p'-aminophenyl) sulphone (1.8% water content) 427.5 parts (75 molar parts) of azelaic acid and 124.5 parts (25 molar parts) of isophthalic acid were mixed together in a closed vessel. 1.2 Parts diethyl ethyl phosphonate and 5 parts of an aqueous solution of potassium chloride (6.0 g. in 50 ml. water) were then added to the closed vessel and lightly mixed.

The process was then continued as in Example 41. The extruded polymer was transparent and pale yellow with a reduced viscosity of 0.73 as measured in Example 1.

EXAMPLES 44–46

A semi-technical scale polymer preparation was carried out as follows. A 100 liter stainless steel autoclave was washed out with boiling ethylene glycol and rinsed with water. The autoclave was fitted with a charging port on the vessel head and an extrusion slit at the base. Nitrogen and vacuum lines were provided, together with stirrer and instrumentation. Internally cooled casting wheels were provided under the extrusion slit.

The polymerisation reactants and diethyl ethylphosphonate (DEP) were tumble blended together with an aqueous solution of a potassium salt and the mixture was charged to the autoclave which was preheated to 180°C. After stirring for 30 minutes an aqueous suspension of titanium dioxide was added if required. The temperature was raised to 260°C and the pressure reduced progressively to 1 mm Hg. After 1½ hours the reaction was stopped by extrusion of the product under nitrogen, casting onto cooled rollers followed by chipping and logging. The products were pale yellow with reduced viscosities in the range 0.65–0.80.

Quantities of materials used were as follows:

| Example No. | Diamino diphenyl sulphone (Kg) | Azelaic Acid (Kg) | Iso-Phthalic acid (Kg) | DEP g | $TiO_2$ (g. in 1 liter $H_2O$) | Potassium* salt (g. in 175 ml $H_2O$) |
|---|---|---|---|---|---|---|
| 44 | 17.54[a] | 13.30 | — | 28 | 158 | 14 |
| 45 | 17.54[a] | 13.30 | — | 2.8 | 158 | 14 |
| 46 | 17.57[b] | 10.64 | 2.32 | 11.2 | — | 14 |

*Example 44 and 45 - potassium chloride, Example 46 - potassium acetate
[a]Water content 0.9%
[b]Water content 1.2%

What we claim is:

1. A process for the production of a moldable or film- or fiber-forming polyamide in which at least one bis-(aminophenyl)sulfone, or amide-forming derivative thereof, and at least one dicarboxylic acid, or amide-forming derivative thereof, in substantially equimolar proportions are heated together at 160° to 330°C under an inert atmosphere in the presence of a catalyst selected from the group consisting of at least one compound having the formula $(RO)_2R$ E=O and a product of mixing at least one compound having the formula $(RO)_2R$ E=O with at least one metal salt, said metal salt being a member of the group consisting of oxides, acetates, acetyl acetonates, halides and hydroxides of zinc, manganese, lanthanum, calcium, aluminum, magnesium, cobalt, cadmium, nickel, chromium, titanium, cerium, zirconium, thorium, and alkali metals, where R is selected from the group consisting of alkyl groups and phenyl groups and E is an element of Group VB of the periodic table of the elements having an atomic number greater than 7.

2. A process according to claim 1 in which the bis-(aminophenyl) sulphone is the 4,4'-isomer and in which the dicarboxylic acid is a linear α,ω-dicarboxylic acid having from 6 to 16 carbon atoms.

3. A process according to claim 1 in which from 10 to 25 mole % of the dicarboxylic acid is a carbocyclic diacid, the remainder being a linear aliphatic α,ω-dicarboxylic acid having from 6 to 16 carbon atoms in all.

4. A process according to claim 1 in which the catalyst used in an admixture of a potassium salt and a dialkyl alkylphosphonate containing from 1 to 4 carbon atoms in each alkyl group.

* * * * *